United States Patent [19]
Kawamura

[11] 4,156,479
[45] May 29, 1979

[54] DISC FOR A VEHICLE DISC-BRAKE

[75] Inventor: Koji Kawamura, Susono, Japan

[73] Assignee: Toyota Jidosha Kogyo Kabushiki Kaisha, Aichi, Japan

[21] Appl. No.: 852,933

[22] Filed: Nov. 18, 1977

[30] Foreign Application Priority Data

Jun. 13, 1977 [JP] Japan .................................. 52-69654

[51] Int. Cl.² ............................................. F16D 65/12
[52] U.S. Cl. ................................ 188/218 A; 188/1 B
[58] Field of Search .................... 29/233; 188/218 XL, 188/218 A, 250 E, 250 F, 250 G, 264 B, 1 B, 73.1, 0.5

[56] References Cited

U.S. PATENT DOCUMENTS 1,860,375   5/1932   Winterer et al. ............... 188/218 XL

FOREIGN PATENT DOCUMENTS 48-2952   1/1973   Japan.
51-38868  10/1976  Japan.
51-39311  10/1976  Japan.

*Primary Examiner*—Duane A. Reger
*Attorney, Agent, or Firm*—Stevens, Davis, Miller & Mosher

[57] ABSTRACT

A disc for a disc-brake used in a vehicle. The disc is, on the whole surface portion thereof where it contacts the pad, provided with a number of circular machined scores, or in some cases spiral scores which, having a small pitch, are almost circular the center of scores being at the rotation center of the disc. The scores are ground or cut having a surface roughness of 2 microns or more taken in ten point height, that is, in average height at randomly selected ten points, by ISO R 468.

5 Claims, 7 Drawing Figures

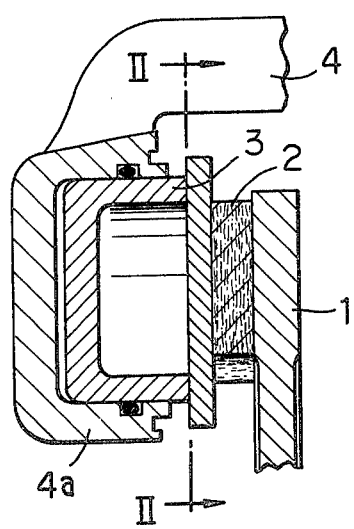
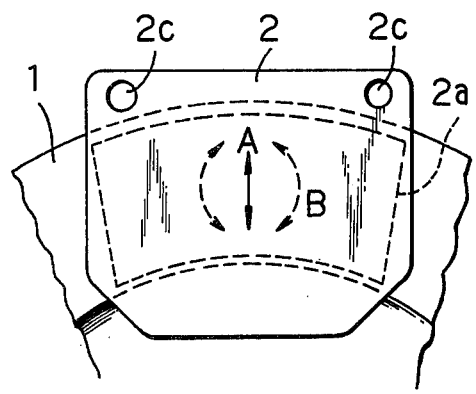
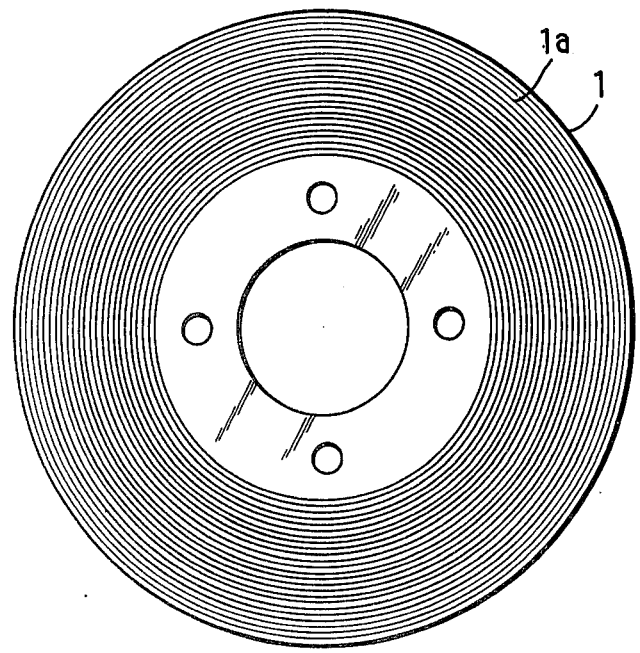
FIG.1
FIG.2
FIG.3

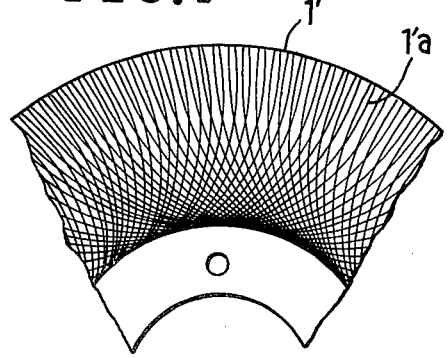
FIG.7 CONVENTIONAL

DISC FOR A VEHICLE DISC-BRAKE

BACKGROUND OF THE INVENTION

This invention relates to a disc in a disc-brake for vehicle use, more particularly to the provision of a disc highly effective in preventing noise in the disc-brake.

Disc-brakes are generally liable to produce an unpleasant noise or squeal when the brake pedal is depressed, for which noise various preventive attempts have been taken. It is well known that the squeal of the disc-brake may be caused by the resonance of a brake-pad (hereinafter simply called pad), whereby restriction of pad movement or damping of the same is effective preventing squealing.

The conventional techniques therefor, as, for example, in Toku-Kai-Sho-51-38868, Toku-Kai-Sho-51-39311 laid open in Japan, etc., possess disadvantages, such as increased component parts, complicated parts configuration, or difficulty of assembly. Morover, where restriction of pad movement is attempted, a further problem, a drag phenomenon, arises often, due to a residual sliding contact of the pad on the disc even after the release of the brake pedal.

The inventor of this invention succeeded some time ago in preventing the squeal due to the resonance of a pad, by restricting the movement of the pad through an improvement in the disc itself, not in the pad or other members carrying the same. That improvement, an invention itself, is now pending as with patent application with No. Toku-Gan-Sho-51-134877 filed with the Japanese Government Patent Office.

Since the disc rotates together with the wheel and the pad is stationary, being mounted on a non-rotating place through a caliper, a mounting bracket, etc., it would seem impossible to restrict the movement of the stationary pad by means of the rotating disc. This assumption of impossibility has been discovered to be incorrect.

The present invention is aimed at a further improvement of the aforementioned invention. While the previous invention is based on the concept of restricting pad movement through its engagement between a few great grooves and/or ribs, disposed on the surface of the disc around its rotation axis, and mating ribs and/or grooves naturally formed on the surface of the pad corresponding to those on the surface of the disc, the present invention aims at a drastically altered form of the grooves and/or ribs for attaining an effect like that of the previous invention. That is to say, a number of circular ground scores or cut scores are formed on the surface of the disc around its rotation axis. It will be quite naturally understood that ground scores or cut scores having a surface coarseness or roughness above a certain level are highly effective in restricting movements of the pad in the direction parallel to that of the disc surface, by imagining the feeling of cleaning the surface of a phonograph record with a wiper.

SUMMARY OF THE INVENTION

It is therefore a primary object of this invention to provide a disc for a disc-brake highly efficient in preventing the squeal due to the resonance of the pad by forming circumferential ground scores or cut scores on the surface thereof where it contacts the pad.

It is another object of this invention to provide a novel disc for the purpose, completely eliminating the shortcomings of the conventional techniques, i.e., increased component parts, complicated parts, difficulty of assembly, and frequent occurrence of undesirable drag.

It is another object of this invention to provide a novel and economical disc for the purpose, by simplifying the complicated manufacturing method through the introduction of an ingenious grinding or cutting process in place of the conventional one (which has required great care in grinding the disc surface), to minimize the variation of the thickness of the disc in the circumferential direction (for example, below 0.005 mm).

Other objects, constructions, and effects of this invention will be apparent upon studying the description of a few preferred embodiments in conjunction with the accompanying drawings.

BRIEF DESCRIPTION OF THE DRAWINGS

FIG. 1 is a vertical sectional side view of an essential part of disc-brake incorporating the invented disc;

FIG. 2 is a view showing the positional relation of a disc and a pad seen at the plane taken along the line II — II of FIG. 1;

FIG. 3 is an elevation of a disc representing an embodiment of this invention;

FIG. 7 is the fractional elevation of the conventional disc.

DETAILED DESCRIPTION OF A FEW PREFERRED EMBODIMENTS

Figure 4:
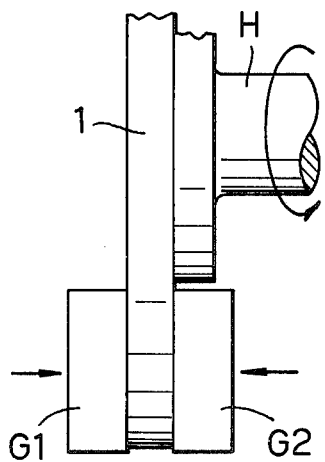
FIG. 4 is a diagrammatic view for explaining the manufacturing method for the disc in FIG. 3.

In FIGS. 1 and 2 a disc is denoted by the numeral 1; numeral 2 denotes a pad, 3 denotes a piston, and 4, a caliper. The pad 2 is, as shown in FIG. 2, provided with a pair of through-bores 2c at each shoulder portion thereof and carried by the caliper 4 through a rod (not shown) passing the through-bore. The caliper 4 is fixedly mounted on a non-rotating member (not shown) in a straddling posture above the disc 1, and provided with a cylinder 4a at one or both end portions thereof, in which cylinder 4a is slidably fitted a piston 3. Piston 3 is pushed toward the disc 1, when braking fluid pressure is applied within the cylinder 4a, thus pressing the pad 2 on to the rotating disc 1 for braking the rotation of the disc 1 through a sliding contact under pressure.

It is necessary that the pad 2 is carried in such a manner as to be able to move in a direction normal to the surface of the disc 1. As a result of this, the pad 2 inevitably has a slight freedom of movement in the direction parallel to the surface of the disc 1. Numerous repetitions of this slight movement, of the pad 2 parallel to the surface of the disc eventually results in a vibration which in turn causes the squeal of the disc-brake.

In this embodiment a disc 1 in accordance with the invention has, on the opposite surfaces thereof where the disc 1 is to be sandwiched by a pair of pads 2, a number of concentric ground scores 1a formed with substantially equal distances therebetween, that shown in FIG. 3, in such a manner as the center of the scores coincides with the rotation center of the disc 1. Consequently, when the brake is applied, an engagement along the numerous wavelike ribs in the circumferential direction occurs between the friction material 2a of the pad 2 and the disc 1, which restrains the vibration of the pad 2 in the direction A and B in FIG. 2.

The ground scores 1a in this embodiment may be attained by grinding the surface of the disc 1 with a pair of grinding tools $G_1$ and $G_2$ symmetrically urged on the opposite sides of the disc 1, which is rotated, as shown in FIG. 4, integrally with the rotary shaft H, whereby both sides of the disc 1 are simultaneously ground, with an elastic deformation of the disc 1 being prevented in the meanwhile.

Aforementioned grinding tools $G_1$ and $G_2$ may be replaced by abrasive cloths or papers backed up by resilient bodies. Besides being pressed against the disc 1, the grinding tools $G_1$ and $G_2$ may also be moved in a radial direction, which results in, the forming of a plural number of spiral scores, rather than circular scores.

Figure 5:
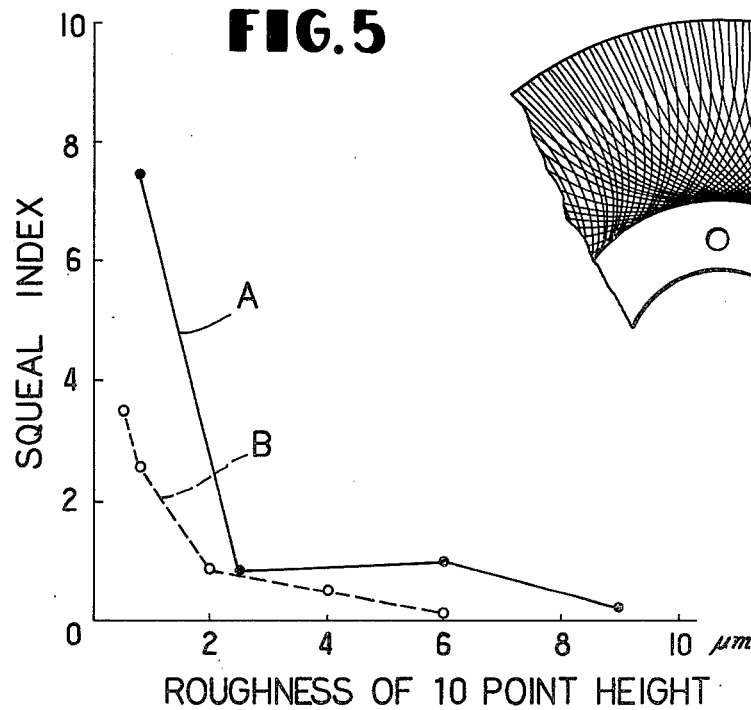
FIG. 5 is a graph showing the test data of the squeal preventing effect achieved by the invented disc.

In order to study the relation between the roughness of the ground scores and the squeal preventing effect, many discs having scores of various degree of roughness (ten point height) were manufactured and tested in an actual disc-brake, the result of which test being shown in FIG. 5.

The squeal index in the Figure is an index representing a degree of squeal occurring likelihood, so to speak, introduced by combining the squeal occurring rate and the squeal magnitude.

Curve A in FIG. 5 indicates the test result in with respect to a brake of the type in which 4 pistons, two on each side, are disposed in a secured caliper; Curve B relates to a brake of the type in which two pistons, one on each side, are disposed in a similarly secured caliper. In both tests, effect of remarkable effect of squeal prevention can be observed in cases where ground scores are 2 microns or more in the ten point height of ISO R 468.

The roughness of a ground surface in the range of 2 to 10 microns can be said to be considerably rough as a ground surface in general; it belongs, however, an extremely fine range, when considered as wave-like ribs or scores. It is surprising to discover that the restraint of vibration of the pad 2 and in the prevention of squeal in the brake, can be attained only by the presence of such fine wave-like ribs.

In addition to this, an extremely enhanced durability of the invented disc, i.e., durability of scores by the new method is worthy of attention as follows:

(1) In the conventional disc 1', in FIG. 7, ground scores of 2-3 microns were erased or worn out by brake repetition of 500 to 1000 times.

(2) In the invented disc the scores also of 2-3 microns were still in good condition even after brake repetition of over 10,000 times.

Such durable scores on the disc surface can be formed, in addition to the abovementioned grinding method, by a cutting method. The cut scores are alike with the ground scores durable and effective for squeal prevention. For making the scores, the surface of the disc 1 where the pad contacts the same may be cut by a cutting machine.

Figure 6:
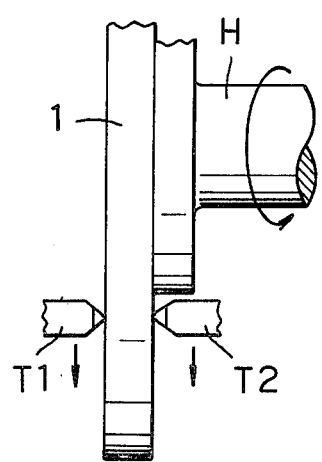
FIG. 6 is a diagrammatic view for illustrating the manufacturing method for another embodiment of the invented disc.

In this case it is desirable to cut both sides of the disc 1 simultaneously with a pair of cutting tools, $T_1$ and $T_2$, as shown in FIG. 6, disposed on opposite sides of the disc 1, whereby both tools $T_1$ and $T_2$, are moved in a radial direction of the disc while the same rotates integrally with the rotary shaft H. This method is effective in preventing the disc 1 from being elastically deformed, and thereby in keeping the same in a high working accuracy.

Although the scores formed by the cutting method can not, exactly speaking, be said to be circular and/or concentric, but rather are spiral, the pitch of the spirals is so small that they can function, in reality, as perfectly circular scores. With the cutting method, it is more difficult to form sharp or acute-angled scores in comparison with the grinding method; with the former method however, it is far easier to form coarse scores than with the latter.

The embodiments described above are disclosed only by way of examples, so the invention should not be construed as being limited to them, but naturally includes some modifications and variations which those skilled in the art can make, so long as they do not deviate from the spirit of the invention.

What is claimed is:

1. A disc for a disc-brake used in a vehicle wherein a pair of brake pads carried by a non-rotating member slidingly contacts the surfaces of said disc as said disc rotates with a wheel of the vehicle to brake the vehicle, said disc having a number of minute circular grooves formed on the whole surface portion on at least one side of said disc where said pads slidingly contact therewith, said minute circular grooves having their center at the rotation center of said disc and defining an area having a surface roughness of 2 to 10 microns taken in ten point height of ISO R 468.

2. A disc as set forth in claim 1, wherein said minute circular grooves are ground grooves formed by a grinding tool.

3. A disc for a disc-brake used in a vehicle wherein a pair of brake pads carried by a non-rotating member slidingly contacts the surfaces of said disc as said disc rotates with a wheel of the vehicle to brake the vehicle, said disc having at least one minute spiral groove formed on the whole surface portion of at least one side of said disc where said pads slidingly contact therewith, said minute spiral groove having its center at the rotation center of said disc and defining an area having a surface roughness of 2 to 10 microns taken in ten point height of ISO R 468, and further, said minute spiral groove having such a small pitch as to effectively form an aggregation of concentric minute circular grooves.

4. A disc as set forth in claim 3, wherein said minute spiral groove is a cut groove formed by a cutting tool.

5. A disc as set forth in claim 3 having a plurality of minute spiral grooves wherein said grooves are ground grooves formed by a grinding tool.

* * * * *